US012576827B2

(12) United States Patent
Shah et al.

(10) Patent No.: US 12,576,827 B2
(45) Date of Patent: Mar. 17, 2026

(54) ELECTRIC VEHICLE LAUNCH CONTROL AND THERMAL MANAGEMENT

(71) Applicant: FCA US LLC, Auburn Hills, MI (US)

(72) Inventors: Preyash H Shah, Brampton (CA); Karthik Valuri, Auburn Hills, MI (US); Godla Sagar Naidu, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 76 days.

(21) Appl. No.: 18/604,696

(22) Filed: Mar. 14, 2024

(65) Prior Publication Data

US 2025/0289407 A1      Sep. 18, 2025

(51) Int. Cl.
*B60W 10/18* (2012.01)

(52) U.S. Cl.
CPC ......... *B60W 10/18* (2013.01); *B60W 2540/10* (2013.01); *B60W 2540/12* (2013.01)

(58) Field of Classification Search
CPC ............. B60W 10/18; B60W 2540/10; B60W 2540/12
USPC ........................................................ 701/70
See application file for complete search history.

(56) References Cited

FOREIGN PATENT DOCUMENTS

| | | | | | |
|---|---|---|---|---|---|
| CN | 112498126 | A | * | 3/2021 | ............ B60W 30/06 |
| CN | 115071445 | A | * | 9/2022 | ................ B60L 3/10 |
| CN | 117054873 | B | * | 12/2023 | ........... G01R 31/343 |
| CN | 117207787 | A | * | 12/2023 | ............ B60W 30/18 |
| CN | 118722266 | B | * | 12/2024 | .......... B60L 15/2018 |
| WO | WO-2018166862 | A1 | * | 9/2018 | .......... B60W 10/184 |

\* cited by examiner

*Primary Examiner* — Hai H Huynh
(74) *Attorney, Agent, or Firm* — Jeremy J. Klobucar

(57) ABSTRACT

A vehicle system for an electrified vehicle, which implements a launch control mode to launch the electrified vehicle with a torque pre-load, includes an electric traction motor configured to selectively provide drive torque to wheels of the vehicle, a thermal system configured to cool the electric traction motor, a brake system to brake one or more of the vehicle wheels, and a controller having one or more processors. The controller is programmed to determine whether one or more vehicle conditions are satisfied, and apply a torque pre-load to the vehicle wheels via the electric traction motor, based on the vehicle conditions being satisfied, while the vehicle is at a standstill by braking the vehicle wheels with the brake system.

20 Claims, 4 Drawing Sheets

ELECTRIC VEHICLE LAUNCH CONTROL AND THERMAL MANAGEMENT

FIELD

The present application relates generally to vehicle launch control systems and, more particularly, to electric vehicle launch control and thermal management.

BACKGROUND

Some high performance vehicles have powertrains that are so powerful that launch control techniques are preferred to prevent wheel slip and to optimize vehicle performance, particularly for drag racing scenarios. However, such vehicles may still experience drivetrain losses at standstill. Additionally, in battery electric vehicles, there may be incomplete temperature monitoring across critical components, which may hinder management of temperature rise and potentially result in overheating of the critical components. Thus, while such systems do work well for their intended purpose, it is desirable to provide continuous improvement in the relevant art to provide greater utility.

SUMMARY

In accordance with one example aspect of the invention, a vehicle system for an electrified vehicle that implements a launch control mode to launch the electrified vehicle with a torque pre-load is provided. In one exemplary implementation, the vehicle system includes an electric traction motor configured to selectively provide drive torque to wheels of the vehicle, a thermal system configured to cool the electric traction motor, a brake system to brake one or more of the vehicle wheels, and a controller having one or more processors. The controller is programmed to determine whether one or more vehicle conditions are satisfied, and apply a torque pre-load to the vehicle wheels via the electric traction motor, based on the vehicle conditions being satisfied, while the vehicle is at a standstill by braking the vehicle wheels with the brake system.

In addition to the foregoing, the described vehicle system may include one or more of the following features: wherein the controller is further programmed to preemptively cool the electric traction motor with the thermal system prior to applying the torque pre-load; wherein the thermal system includes a coolant loop configured to circulate a coolant to cool the electric traction motor, an inverter, and windings of the electric traction motor; and wherein the controller is configured to launch the electrified vehicle, after the torque pre-load is applied, when a driver releases a brake pedal.

In addition to the foregoing, the described vehicle system may include one or more of the following features: wherein the one or more vehicle conditions includes a brake pedal and an accelerator pedal are pressed, a brake pressure is above a predetermined threshold, a steering wheel angle is within a predetermined range, and a temperature of the electric traction motor is below a predetermined threshold; wherein the controller is further programmed to determine if an abort condition exists during the launch control mode, and subsequently abort the launch control mode and remove the torque pre-load if the abort condition exists; wherein the abort condition includes expiration of a predetermined time since the torque pre-load was applied; wherein the torque pre-load is applied to all wheels of the vehicle; and wherein the controller aborts the torque pre-load if an accelerator pedal is released during the launch control mode.

In accordance with another example aspect of the invention, a method of operating an electric vehicle having an electric traction motor, a thermal system configured to cool the electric traction motor, and a brake system to brake one or more vehicle wheels is provided. In one exemplary implementation, the method includes (i) determining, by a controller having one or more processors, whether one or more vehicle conditions are satisfied, and (ii) applying, by the controller, a torque pre-load to the vehicle wheels via the electric traction motor, based on the vehicle conditions being satisfied, while the vehicle is at a standstill by braking the vehicle wheels with the brake system.

In addition to the foregoing, the described method may include one or more of the following features: by the controller, preemptively cooling the electric traction motor with the thermal system prior to applying the torque pre-load; wherein the thermal system includes a coolant loop configured to circulate a coolant to cool the electric traction motor, an inverter, and windings of the electric traction motor; by the controller, launching the electrified vehicle, after the torque pre-load is applied, when a driver releases a brake pedal; and wherein the one or more vehicle conditions includes a brake pedal and an accelerator pedal are pressed, a brake pressure is above a predetermined threshold, a steering wheel is straight, and a temperature of the electric traction motor is below a predetermined threshold.

In addition to the foregoing, the described method may include one or more of the following features: determining, by the controller, if an abort condition exists during the launch control mode, and subsequently, by the controller, aborting the launch control mode and removing the torque pre-load if the abort condition exists; wherein the abort condition includes expiration of a predetermined time since the torque pre-load was applied; wherein the torque pre-load is applied to all wheels of the vehicle; and by the controller, aborting the torque pre-load if an accelerator pedal is released during the launch control mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
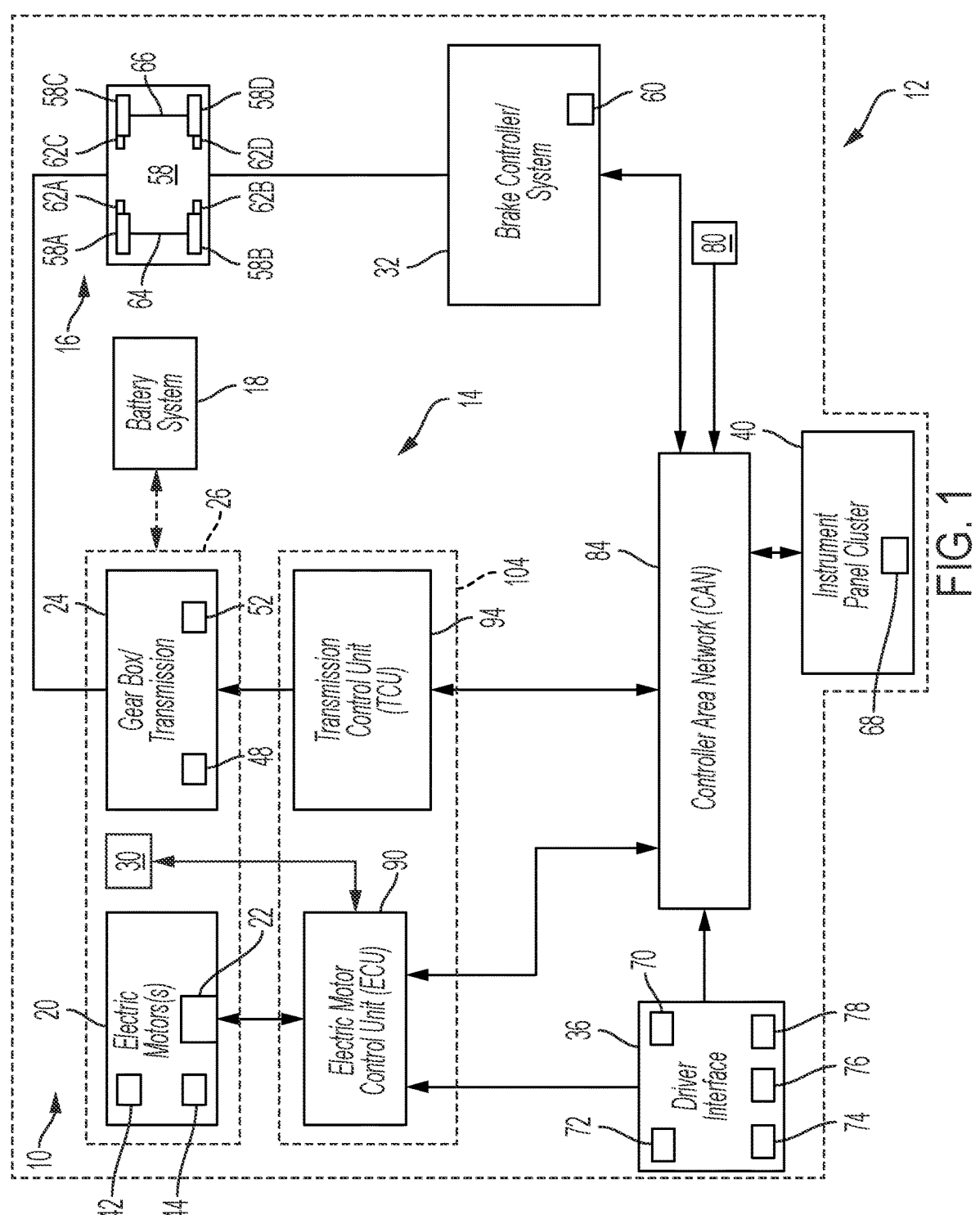
FIG. 1 is a schematic block diagram of an exemplary vehicle system according to the principles of the present disclosure.

As previously discussed, during launch events, battery electric vehicles (BEVs) may experience drivetrain losses at standstill and incomplete temperature monitoring across critical components. Accordingly, the systems and methods described herein improve vehicle race launch operations and thermal management. More specifically, a launch control system improves launch performance and acceleration by overcoming drivetrain losses and inefficiencies such as inertia of the vehicle at standstill. The system also integrates advanced thermal management techniques by using the thermal system (e.g., coolant loop) to cool down electric motor components. By accurately modeling temperature rise across all relevant components and strategically distributing heat dissipation, the system effectively mitigates overheating risks and ensures consistent high performance for the launch control feature.

The launch control system further enhances performance and drive efficiency using a Torque Pre-Loading operation to minimize powertrain losses at vehicle standstill to thereby improve overall driving dynamics. To counter incomplete temperature monitoring and potential overheating, the launch control system integrates advanced thermal management with the thermal system for efficient component cooling to provide consistent, dependable, and high performance launch control.

As such, the BEV includes a torque pre-loading mechanism to mitigate drivetrain losses and optimize torque delivery, thereby enhancing overall efficiency. The system seamlessly executes initialization checks, thereby facilitating precise pre-load calibration upon activation of the launch control by a user. This process is orchestrated through a control algorithm that capitalizes on data derived from various sources/sensors such as, for example, the brake pedal, accelerator pedal, steering wheel angle, motor speed, and vehicle speed. Such inputs collectively determine the conditions that warrant activation of the torque pre-load. During this process, torque generated while stationary is transferred through the drivetrain for a customizable time duration, with the delivered torque adhering to both system limitations and predefined ceiling torque values.

The described launch control system with the torque pre-load feature is different from traditional launch control in several ways. First, the system provides enhanced acceleration by optimizing power delivery and reducing drivetrain losses. The torque pre-load feature enables quicker and smoother acceleration. Without the torque pre-load, there may be a delay in power delivery from the electric motor to the drivetrain during launch control. This delay can lead to slower acceleration times and reduced overall performance, potentially impacting the vehicle ability to achieve optimal speed quickly. Second, the system provides consistent launches. The torque pre-load feature allows for consistent and repeatable launch experiences with identical or nearly identical acceleration times. This ensures that each launch feels consistent, regardless of the driving conditions or the skill level of the driver. Third, the system is configured to prevent traction loss and wheel spin. In some situations, the absence of torque pre-loading during launch control can lead to traction loss and wheel spin. The sudden application of high torque without optimizing power delivery to the wheels can cause the tires to lose grip on the road surface, reducing traction and hindering the vehicle ability to gain speed effectively.

As such, the electric vehicle described herein includes a launch control system with a control algorithm configured to engage the driveline under controlled conditions, with motor assistance during standstill when the launch control feature is activated and specific conditions are met. Example conditions includes brake pedal actuation, brake pressure, accelerator pedal actuation, steering angle, AWD status, motor speed and temperature, and/or drive mode status. Further, a closed-loop monitoring system is established to consistently track the motor temperature (e.g., windings), power electronics, and inverters, and subsequently analyze the rise/curve/change via one or more thermal sensors.

The control system also includes an internal control algorithm to forecast temperature trends by referencing the rise in oil and/or coolant temperature over time. This is a predictive model that serves as a correction offset for a calculated torque stress factor. The resulting refined torque stress factor is subsequently utilized to proactively trigger component cooling measures. In this way, the control system is configured to provide consistent vehicle launches by delivering calibrated torque within permissible timeframes while adhering to system limitations over time and diverse atmospheric conditions. Moreover, the system safeguards against rapid heating of temperature-sensitive electric motor components, thereby averting potential system failures. The control also features an abort mechanism, which terminates the function if excessive temperature increases in the motor components are detected. While described in certain scenarios herein, it will be appreciated that the abort feature may occur or be implemented at any time throughout the Launch Control or even after launch.

Additionally, the launch control system enables users to adjust torque pre-load levels, within predefined limits, using the accelerator pedal. This feature is configured to replicate the behavior of conventional internal combustion engines with torque converter applications, even at zero motor RPM.

Referring now to FIG. 1, a schematic diagram of a vehicle system 10 for an electrified vehicle 12 according to example implementations of the disclosure is illustrated. In accordance with various aspects of the present disclosure, interactive techniques, referred to herein as a "launch control mode," for permitting the vehicle 12 to perform a launch control event are implemented utilizing the vehicle system 10. As will be discussed in greater detail below, in one example implementation, the interactive launch control mode is initiated upon a vehicle driver selecting a launch control mode from an interactive menu displayed on an instrument cluster of the vehicle system 10.

With continuing reference to FIG. 1, the exemplary vehicle system 10 of the exemplary electrified vehicle 12 includes an electrified powertrain 14 configured to transfer drive torque to a driveline 16 of the vehicle 12 for propulsion. The electrified powertrain 14 generally comprises a high voltage battery system 18, one or more electric motors 20 with an associated inverter 22, and a gearbox or transmission 24. The one or more electric motors 20, the inverter 22, and the transmission 24 can be collectively referred to herein as an electric drive module 26. While the exemplary implementation includes a transmission 24, in some examples the electrified powertrain 14 does not include a transmission.

In the example embodiment, the vehicle system 10 further includes a thermal system 30 configured to cool one or more portions of the electric motor(s) 20 (e.g., windings) and the inverter(s) 22. As described herein in more detail, the thermal system 30 is configured to facilitate thermal management and efficient component cooling during launch control. In one example, not shown, the thermal system includes a pump configured to circulate a coolant (e.g., water, refrigerant, oil, etc.) through a coolant loop thermally coupled to a heat exchanger (for heat dissipation). It will also be appreciated that thermal system 30 may be utilized to heat one or more of the noted components, for example, during a cold start.

The vehicle system 10 further includes a brake system controller 32. While shown together it will be appreciated that the vehicle system can have a dedicated brake control system that operates independent of an anti-lock brake system. The vehicle system 10 further includes a driver interface 36 and an instrument panel or cluster 40. The instrument panel or cluster 40 can include any interface device, such as a driver information center and/or vehicle infotainment system capable of receiving input from a driver.

The electric motor 20 also includes one or more motor speed sensors 42 and one or more motor temperature sensors 44. The motor speed sensor 42 is configured to sense a speed of electric motor 20, and the motor temperature sensor 44 is configured to sense a temperature of one or more portions of the electric motor 20 (e.g., motor windings). As described herein in more detail, the sensors 42, 44 are configured to provide one or more signals to facilitate thermal management and efficient component cooling during launch control.

The transmission 24 includes various transmission speed sensors, such as input and output transmission shaft speed sensors 48 and various shift sensors 52, to provide a signal to an associated control system indicative of a transmission gear selected. The transmission 24 and brake system controller 32 are coupled or selectively coupled, directly or indirectly, to one or more wheels 58 of vehicle 12, as is known in the art. In the exemplary vehicle system, all of the wheels 58 are drive wheels that receive torque input. While the motor 20 is described herein as an electric traction motor, in other examples, the vehicle system 10 can be configured with a conventional internal combustion engine (ICE), or as a hybrid electric vehicle.

The wheels 58 are identified individually as front wheels 58A, 58B and rear wheels 58C, 58D. The wheels 58A, 58B, 58C and 58D each have wheel speed sensors 62A, 62B, 62C and 62D. In the example shown, the front wheels 58A and 58B are selectively coupled by a front axle 64. Similarly, the rear wheels 58C and 58D are selectively coupled by a rear axle 66. In the exemplary implementation illustrated, the brake system controller 32 is controlled to activate foundation brakes 60.

The instrument panel cluster 40 includes various indicators, such as a launch control mode activate light or indicator 68. In one example, the instrument panel cluster 40 provides a menu driven sequence to the driver to enable launch control mode. The driver interface 36 includes a steering wheel 70 and a brake pedal 72, and a driver input device (e.g., an accelerator pedal 74) for providing a driver input (e.g., a torque request) to the motor 20. The driver interface 36 can further include a park brake 76. The driver interface 36 or vehicle interior also includes a transmission shift request device, such as a shift lever or rotary shifter 78, for the driver to request a desired gear of the transmission 24. The shift lever or rotary shifter 78 can provide conventional transmission options including park, reverse, neutral, drive and low.

The vehicle system 10 also includes sensors 80. The sensors 80 can include longitudinal sensor or other equivalent sensor for providing data indicative of whether or not the vehicle 12 is on a grade and the incline or angle of the grade. The sensors 80 can also include sensors to determine accelerator or brake pedal actuation, brake pressure on wheels 58, steering wheel angle, all wheel drive (AWD) status, and drive mode (e.g., race, sport, snow, etc.).

One or more controllers are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

In the example illustrated in FIG. 1, the vehicle system 10 includes an electric motor control unit (ECU) 90 for controlling the motor 20, and a transmission control unit (TCU) 94 for controlling the transmission 24. Both of the control units 90 and 94 as well as the brake system controller 32, driver interface 36, instrument cluster 40 and sensor 80 are in communication with CAN 84 and thus each other. Again, in some examples a transmission 24 and therefore the TCU 94 is not included. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle system 10 being controlled by one controller.

Figure 2A:
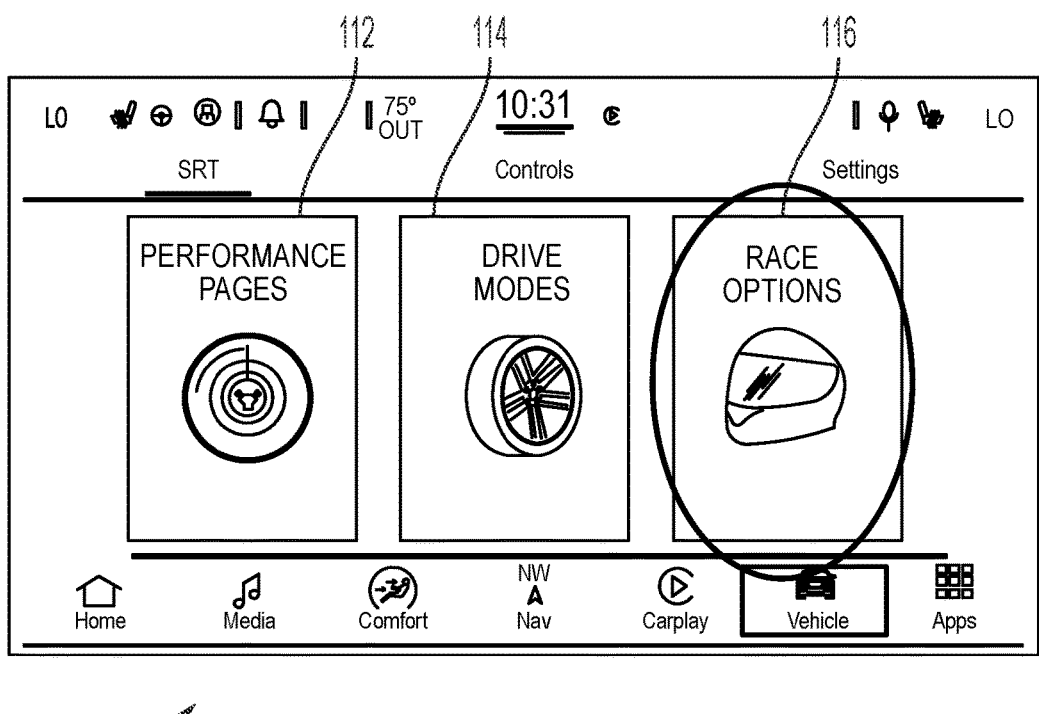
FIGS. 2A-2C are exemplary menu interfaces provided on the instrument panel cluster of the vehicle system of FIG. 1 for entering launch control mode according to the principles of the present disclosure.
Figure 2B:
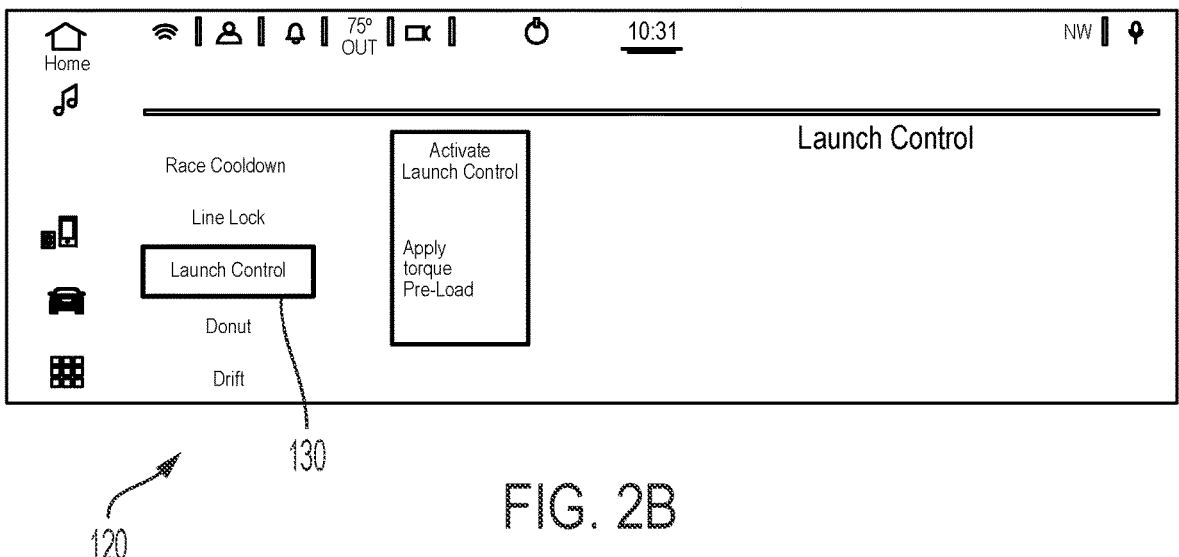
Figure 2C:
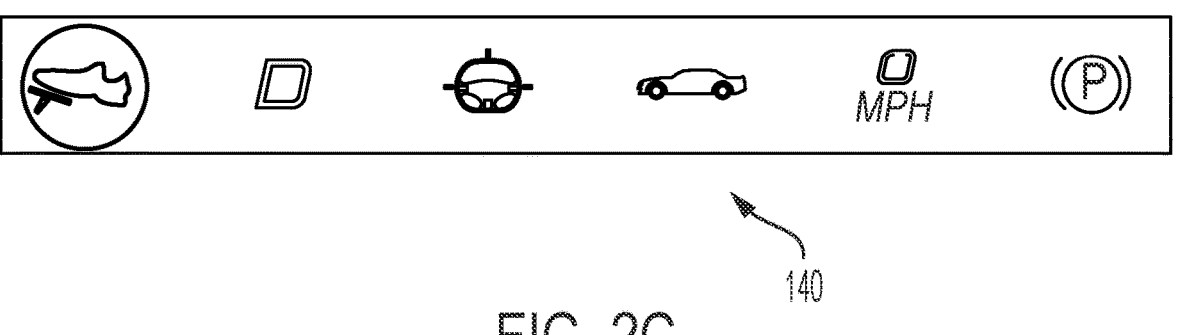

Referring now to FIGS. 2A-2C and with reference back to FIG. 1, an example menu sequence provided to the vehicle driver at the instrument panel cluster 40 will be described. At FIG. 2A, a first menu 110 displays performance pages 112, drive modes 114, and race options 116. As a result of a driver selecting race options 116 at the first menu 110, a second menu 120 (FIG. 2B) is displayed at the instrument panel cluster 40. The second menu 120 can include various modes including a launch control mode 130. As a result of the driver selecting the launch control mode 130 at the second menu 120, a third menu 140 (FIG. 2C) is displayed at the instrument panel cluster 40. The third menu 140 can include instructions to the driver with vehicle conditions that must be satisfied for entering launch control mode.

Exemplary instructions include one or more of the following: a state of charge of the battery system 18 must be above a threshold (such as 20%). The brake pedal 72 and accelerator pedal 74 must be applied. The shift lever or rotary shifter 78 must be in drive. The steering wheel 70 must be straight. The vehicle 12 must be in an AWD mode. The motor speed and temperature must be above/below a predetermined threshold or within a predefined range, such as based on an input from sensors 42, 44. The speed of the vehicle 12 must be zero. The vehicle 12 must be on level ground (such as based on an input from the sensor 80). The park brake 76 must not be engaged. With all desired vehicle conditions being satisfied at the third menu 140, the vehicle 12 is ready for a launch event. It is appreciated that the menus 110, 120, 140 illustrated are merely exemplary and may take many different forms. It is further contemplated that some of the menus (or an additional menu) can be additionally configured to instruct the vehicle driver on how to initiate launch control where optimal straight-line acceleration is provided from a stationary start.

Accordingly, systems and methods or techniques are provided for implementing the launch control mode using the vehicle system 10. One example implementation of such launch control mode technique is discussed below in connection with the exemplary flowchart 200 shown in FIG. 3.

Figure 3:
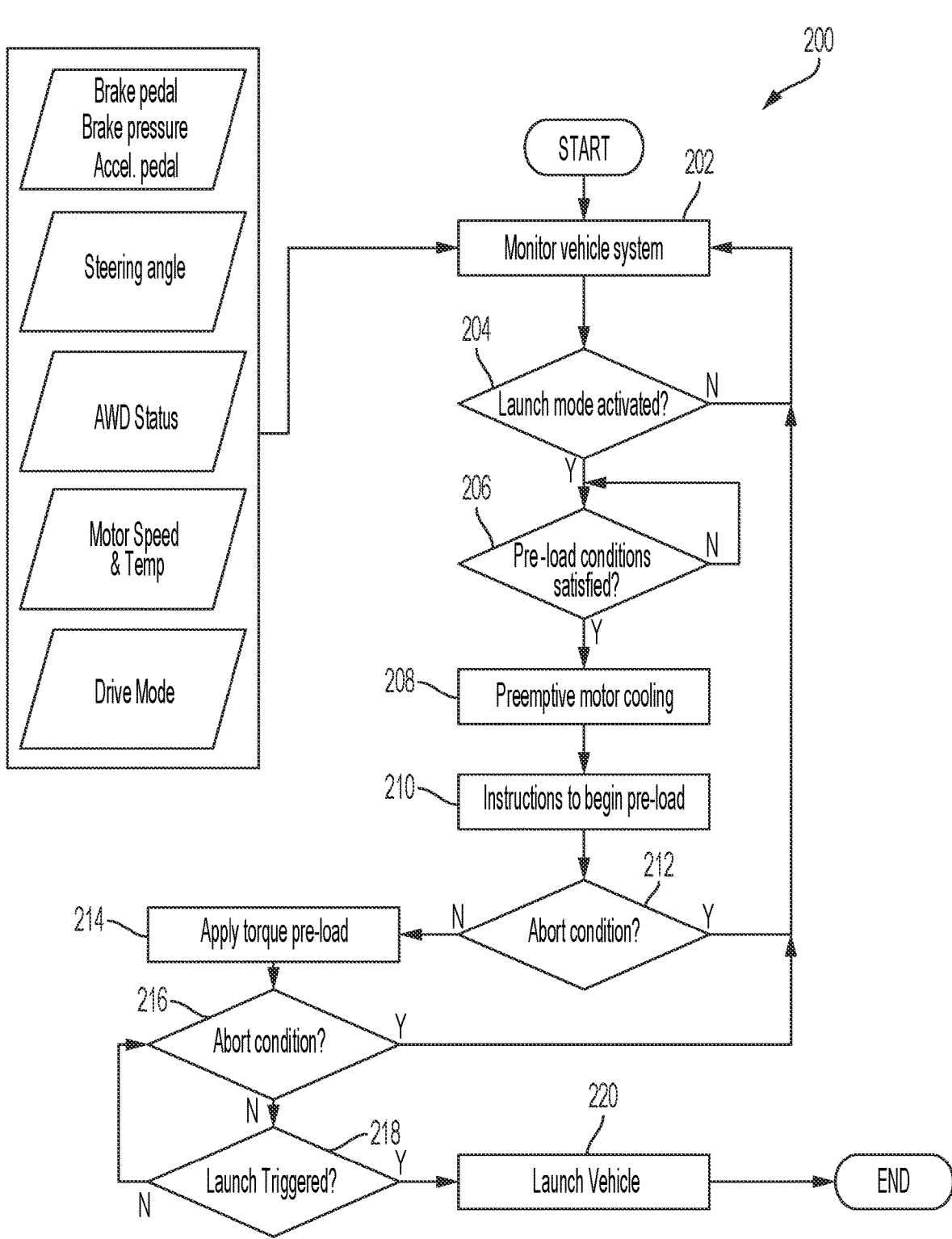
FIG. 3 is an example functional block diagram of a launch control mode implemented by the exemplary controller of FIG. 1 according to the principles of the present disclosure.

With particular reference to FIG. 3, the exemplary methodology 200 for operating a launch control mode in the vehicle system 10 will be described. The method 200 begins at step 202 where the launch control system (e.g., a controller) monitors various systems or components of the vehicle system 10. At step 204, control determines whether the launch control mode has been activated/initiated. Again, the launch control mode can be initiated such as by selection of the launch control mode at menu 120 (FIG. 2B) on the driver interface 36 (see FIG. 1). If the launch control mode has not been initiated, control loops to 202.

If launch control mode has been initiated, control proceeds to step 206 and determines if one or more conditions are satisfied to enable application of a torque pre-load to the wheels 58, via the electric motor(s) 20. Control may determine this based on the input from step 202. For example, the brake pedal 72 must be pressed, the brake system controller 32 must be providing a minimum brake pressure to hold the vehicle at a standstill (even with torque pre-load applied), the accelerator pedal 74 must be pressed, a sensed angle of steering wheel 70 must be within a predetermined range, the driveline 16 must be in AWD, the motor speed and temperature must be within predetermined limits/ranges, and the vehicle must be in a predefined drive mode (e.g., race mode). Alternatively or additionally, control simply confirms the components and/or associated sensors noted above are operating correctly (i.e., no failures detected). In examples, at least one of the controllers 32, 90, 94 can determine whether the vehicle conditions are satisfied. If the enabling conditions have not been satisfied, control loops to 206. It is contemplated that the instrument cluster 40 can alert or highlight to the driver which condition or conditions are not yet satisfied such that the driver can perform corrective actions to satisfy the identified requirements.

If the enabling conditions have been satisfied at 206, control proceeds to step 208 and pre-emptively cools the motor 20, inverter 22, and/or windings (not shown) to prevent overheating thereof when the torque pre-load is applied. In the example embodiment, this includes operating the thermal system 30 (e.g., pump to circulate coolant) to cool the motor 20, inverter 22, windings, and/or other desired component to a predetermined temperature. At step 210, control provides a notification to the driver with instructions to begin the torque pre-load. In one example, the notification instructs the driver to simultaneously press the brake pedal 72 and the accelerator pedal 74 (e.g., if not already pressed).

At step 212, control determines if an abort condition exists. Example abort conditions include a sensor failure, a loss of communication with a component (e.g., steering wheel 70), the accelerator pedal 74 being released, and the motor, inverter and/or windings exceeding a predetermined temperature. If an abort condition exists, control returns to step 204. If an abort condition does not exist, control proceeds to step 214 and applies a torque pre-load to all drive wheels 58A-D while the brakes 60 are applied and the vehicle 12 is at a standstill. In one example, the torque pre-load is a calibratable amount of torque configured to be released when all setting conditions are true based on the pre-set conditions maintained for a calibratable amount of time.

At step 216, control again determines if an abort condition exists such as, for example, a sensor failure, a loss of communication with a component, or a component exceeding a predetermined temperature. Additionally, an abort condition may include the expiration of a predetermined time period since the torque pre-load was applied (e.g., ten seconds). If an abort condition exists, control returns to step 204. If an abort condition does not exist, control proceeds to step 218 and determines if a launch is triggered by the driver. In the example embodiment, the vehicle launch is triggered if the driver releases the brake pedal 72. If the launch is not triggered, control declares an abort condition and returns to step 204. If the launch is triggered, control ends the torque pre-load event and the vehicle 12 is launched at 220. Control then ends.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A vehicle system for an electrified vehicle that implements a launch control mode to launch the electrified vehicle with a torque pre-load, the vehicle system comprising:

an electric traction motor configured to selectively provide drive torque to wheels of the vehicle;

a thermal system configured to cool the electric traction motor;

a brake system to brake one or more of the vehicle wheels; and a controller having one or more processors, the controller programmed to:

determine whether one or more vehicle conditions are satisfied; and apply a torque pre-load to the vehicle wheels via the electric traction motor, based on the vehicle conditions being satisfied, while the vehicle is at a standstill by braking the vehicle wheels with the brake system.

2. The vehicle system of claim 1, wherein the controller is further programmed to preemptively cool the electric traction motor with the thermal system prior to applying the torque pre-load.

3. The vehicle system of claim 2, wherein the thermal system includes a coolant loop configured to circulate a coolant to cool the electric traction motor, an inverter, and windings of the electric traction motor.

4. The vehicle system of claim 1, wherein the controller is configured to launch the electrified vehicle, after the torque pre-load is applied, when a driver releases a brake pedal.

5. The vehicle system of claim 1, wherein the one or more vehicle conditions includes:
a brake pedal and an accelerator pedal are pressed;
a brake pressure is above a predetermined threshold;
a steering wheel angle is within a predetermined range; and
a temperature of the electric traction motor is below a predetermined threshold.

6. The vehicle system of claim 1, wherein the controller is further programmed to:
determine if an abort condition exists during the launch control mode; and
subsequently abort the launch control mode and remove the torque pre-load if the abort condition exists.

7. The vehicle system of claim 6, wherein the abort condition includes expiration of a predetermined time since the torque pre-load was applied.

8. The vehicle system of claim 1, wherein the torque pre-load is applied to all wheels of the vehicle.

9. The vehicle system of claim 1, wherein the controller aborts the torque pre-load if an accelerator pedal is released during the launch control mode.

10. A method of operating an electric vehicle having an electric traction motor, a thermal system configured to cool the electric traction motor, and a brake system to brake one or more vehicle wheels, the method comprising:
determining, by a controller having one or more processors, whether one or more vehicle conditions are satisfied;
applying, by the controller, a torque pre-load to the vehicle wheels via the electric traction motor, based on the vehicle conditions being satisfied, while the vehicle is at a standstill by braking the vehicle wheels with the brake system; and
preemptively cooling the electric traction motor with the thermal system prior to applying the torque pre-load.

11. The method of claim 10, wherein the thermal system includes a coolant loop configured to circulate a coolant to cool the electric traction motor, an inverter, and windings of the electric traction motor.

12. The method of claim 10, further comprising, by the controller, launching the electrified vehicle, after the torque pre-load is applied, when a driver releases a brake pedal.

13. The method of claim 10, further comprising:
determining, by the controller, if an abort condition exists during the launch control mode; and
subsequently, by the controller, aborting the launch control mode and removing the torque pre-load if the abort condition exists.

14. The method of claim 13, wherein the abort condition includes expiration of a predetermined time since the torque pre-load was applied.

15. The method of claim 10, wherein the torque pre-load is applied to all wheels of the vehicle.

16. The method of claim 10, further comprising, by the controller, aborting the torque pre-load if an accelerator pedal is released during the launch control mode.

17. A method of operating an electric vehicle having an electric traction motor, a thermal system configured to cool the electric traction motor, and a brake system to brake one or more vehicle wheels, the method comprising:
determining, by a controller having one or more processors, whether one or more vehicle conditions are satisfied; and
applying, by the controller, a torque pre-load to the vehicle wheels via the electric traction motor, based on the vehicle conditions being satisfied, while the vehicle is at a standstill by braking the vehicle wheels with the brake system,
wherein the one or more vehicle conditions includes:
a brake pedal and an accelerator pedal are pressed;
a brake pressure is above a predetermined threshold;
a steering wheel is straight; and
a temperature of the electric traction motor is below a predetermined threshold.

18. The method of claim 10, further comprising, by the controller, preemptively cooling the electric traction motor with the thermal system prior to applying the torque pre-load.

19. The method of claim 18, wherein the thermal system includes a coolant loop configured to circulate a coolant to cool the electric traction motor, an inverter, and windings of the electric traction motor.

20. The method of claim 17, further comprising, by the controller, launching the electrified vehicle, after the torque pre-load is applied, when a driver releases a brake pedal.

* * * * *